United States Patent [19]

Kirkpatrick et al.

[11] 4,224,783
[45] Sep. 30, 1980

[54] SIDE DRAFT STABILIZER

[75] Inventors: Kenneth L. Kirkpatrick; Dalton H. Spicer, both of Welland; Ken K. Oka, St. Catherines, all of Canada

[73] Assignee: Deere & Company, Moline, Ill.

[21] Appl. No.: 966,029

[22] Filed: Dec. 4, 1978

[51] Int. Cl.³ ............................................ A01D 73/00
[52] U.S. Cl. ..................................................... 56/13.5
[58] Field of Search ................ 56/11.9, 15.7, 1, 315; 111/85; 280/462, 472

[56] References Cited

U.S. PATENT DOCUMENTS

| | | | |
|---|---|---|---|
| 651,626 | 6/1900 | Hord | 56/315 |
| 785,173 | 3/1905 | King | 56/315 |
| 2,472,762 | 6/1949 | Sage | 56/15.7 |
| 2,811,006 | 10/1957 | Heth | 56/315 |
| 3,336,052 | 8/1967 | Johnston et al. | 280/472 |
| 3,457,709 | 7/1969 | Killbery et al. | 56/11.9 |
| 3,604,378 | 9/1971 | McDaniel, Jr. | 111/85 |
| 3,982,772 | 9/1976 | Scherer | 280/462 |
| 4,035,991 | 7/1977 | Oosterling et al. | 56/1 |

Primary Examiner—Robert A. Hafer

[57] ABSTRACT

A simple draft stabilizer is provided for a pull-type harvesting implement having a trailing and transversely extending harvesting header. The stabilizer includes a vertically adjustable earth-penetrating disk blade carried by and to one side of the fore-and-aft extending drawbar. The blade is supported for rotation about a generally horizontal axis and imparts a sidewards force that counters the fallback forces generated by the offset harvesting header. The blade is also mounted to rotate about an axis substantially transversely aligned with the axes of revolution of the wheels supporting the harvesting header to permit sharp turns and avoid skidding damage to the supporting wheel and its mounting structure.

8 Claims, 4 Drawing Figures

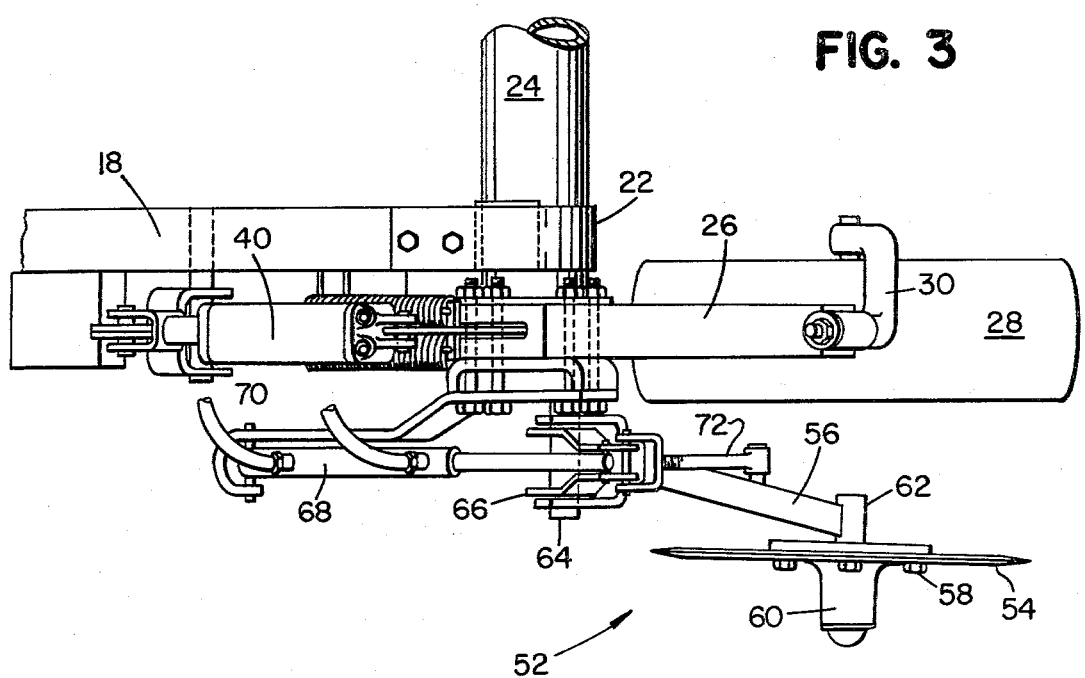
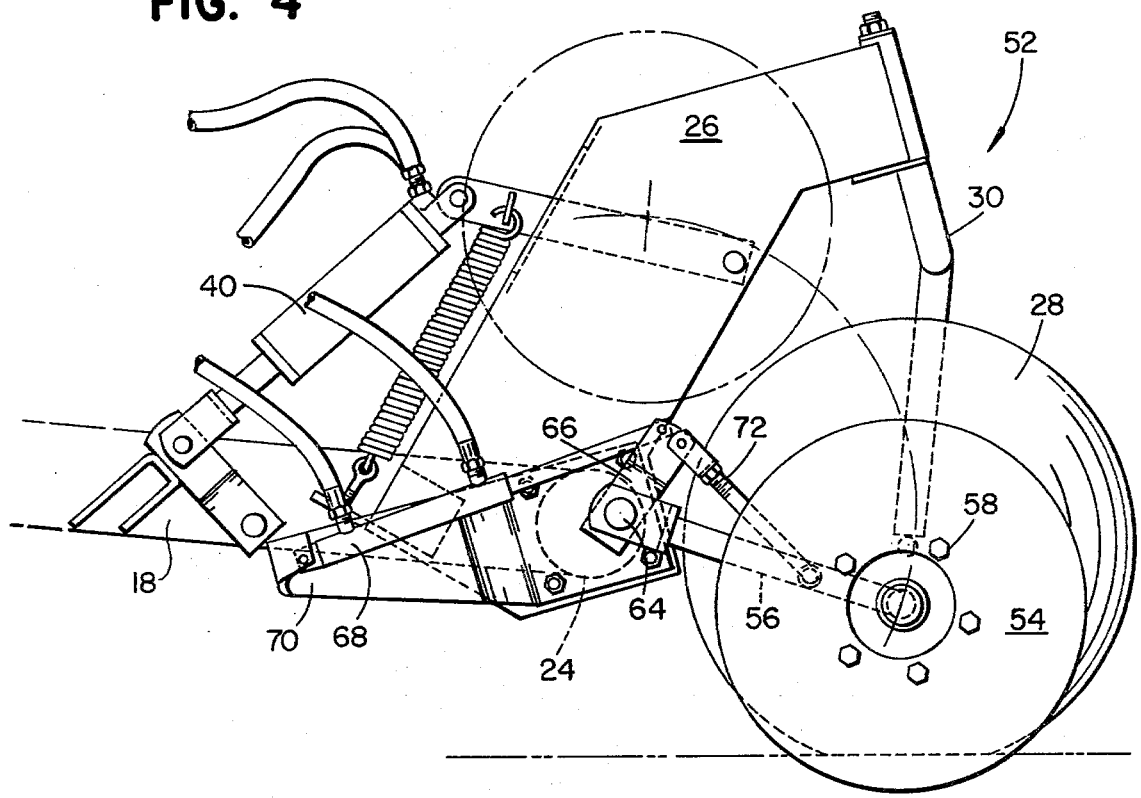

SIDE DRAFT STABILIZER

BACKGROUND OF THE INVENTION

The present invention relates generally to pull-type implements and more particularly to a mechanism for resisting the side draft forces commonly encountered by such implements.

Many pull-type implements such as windrowers include a fore-and-aft extending drawbar and a transversely extending harvesting unit projecting from one side of the drawbar. The offset harvesting unit permits the operator to drive adjacent to the crop while harvesting it with the transversely extending harvesting unit. Since the harvesting unit projects from one side of the drawbar, its outer end will tend to fall back during harvesting and generate side draft forces on the implement. In hilly-type fields, the outer end often falls back significantly as the unit proceeds up the hill.

As farm implements have become wider and larger, windrowers in excess of 25 feet in width have become common. The fallback problem with such harvesting units has accordingly increased. When fallback does occur, the swath of crop harvested becomes narrower and uneven. In some cases the harvesting unit is not able to cut the crop due to the angle of approach. When the harvested width is irregular, subsequent additional operations, such as picking up a windrowed crop with a combine, would become difficult and result in a loss of crop and also productivity.

In an attempt to overcome the fall back problem, some machines have been provided with double wheels at the outer end of the harvesting unit to improve flotation and reduce the rolling resistance of each wheel. While some improvement is realized with this arrangement, there nevertheless remains sufficient drag to cause the outer end of the unit to frequently fall back, particularly when the implement is used to harvest hilly fields.

Another approach utilized to minimize the fallback problem has been the use of powered wheels at the outer end of the harvesting unit. With this solution, an electromagnetic switch is often provided at the hitch connection between the tractor and the implement drawbar. The switch registers the angular disposition of the drawbar relative to the tractor. When a significant degree of fallback occurs, the switch activates the driven outer wheels to bring the harvester back to its appropriate position transverse to the line of travel. This solution is expensive and the switch is often sensitive to environmental contamination prevalent in harvesting operations. As a result the driven wheels are frequently activated and shut off in an attempt to maintain the outer end of the harvesting unit perpendicular to the line of travel. Since it is common to provide powered wheels driven at a speed in excess of the average forward travel speed of the harvester, the driven end of the harvesting unit will constantly seek to remain perpendicular to the line of travel.

SUMMARY OF THE INVENTION

To overcome the fallback problem, a simple inexpensive side draft stabilizing mechanism has been provided for pull-type implements. The stabilizer is comprised of a ground-penetrating disk or coulter blade carried by the implement frame. The blade serves to counter the sideways forces transferred from the harvesting unit to the frame by exerting a force on the frame rearwardly of the connection between the tractor and drawbar.

The blade is transversely spaced to the left side and positioned in near alignment with a line extending through the hitch connection and parallel to the direction of travel. The blade is also directed slightly to the right for an implement having the transversely projecting harvesting unit extending to the right. To permit smooth and sharp turns of the implement at field corners, the axis of rotation of the blade is transversely aligned with the axis of rotation of the ground support wheels.

To permit selective use of the stabilizing device, the blade may be provided with hydraulic means to raise or lower it.

BRIEF DESCRIPTION OF THE DRAWINGS

FIG. 3 is an enlarged plan view of the stabilizing mechanism illustrated in FIG. 1.

FIG. 4 is an enlarged side view of the stabilizing mechanism.

DESCRIPTION OF THE PREFERRED EMBODIMENT

In the following description, right and left-hand references can be determined by standing behind the implement and facing the direction of travel.

Figure 1:
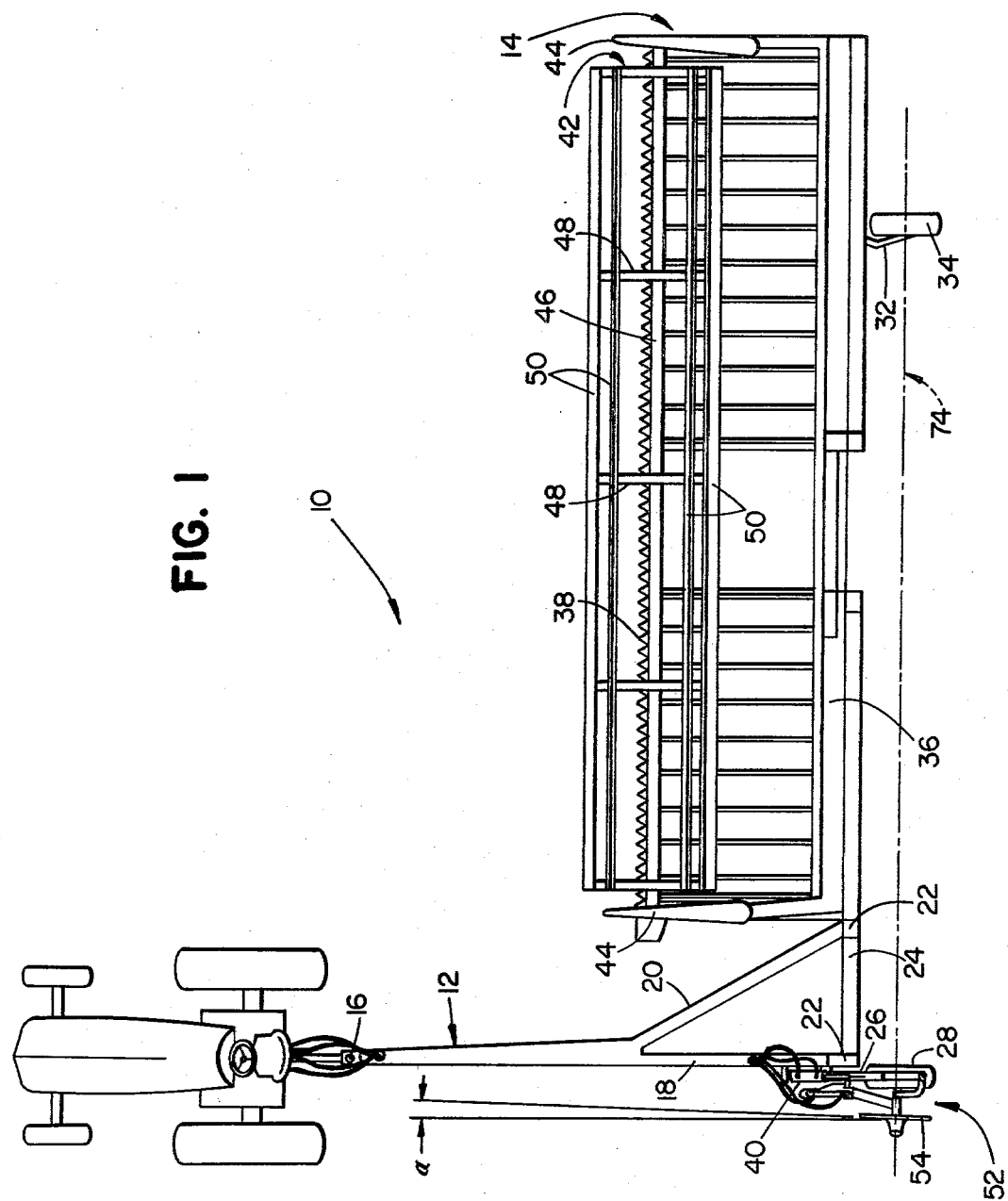
FIG. 1 is a plan view of a pull-type implement on which the improved side draft stabilizing device is utilized.

A pull-type windrower 10 utilizing the principles of the present invention is illustrated in FIG. 1. This windrower 10 includes an L-shaped frame comprised of a fore-and-aft extending drawbar 12 coupled with a transversely extending harvesting unit 14. The drawbar 12 includes a clevis 16 at its forward end for connection to a tractor or similar type of traction vehicle. At its rearward end, the drawbar 12 includes left and right rearwardly diverging members 18 and 20 having bearing blocks 22 thereon. Supported in the bearing blocks 22 is the transverse tubular frame member 24 which carries the harvesting unit.

Figure 2:
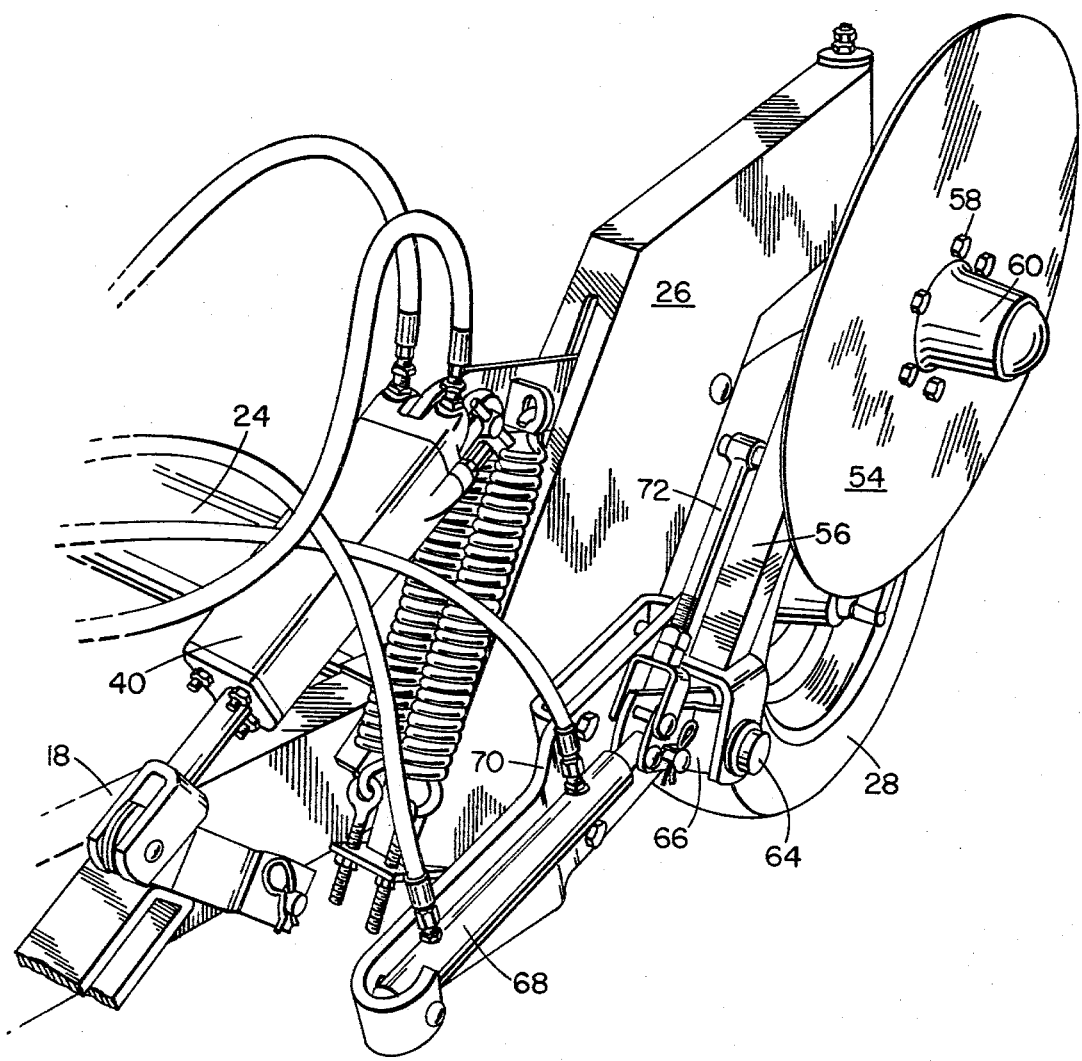
FIG. 2 is an enlarged perspective view of the stabilizing mechanism.

Looking now to FIGS. 2, 3 and 4, it is seen that at the left end of the tubular member 24 and fixed rigidly thereto is an upstanding plate-like structure 26 which supports the ground-engaging wheel 28 on a downwardly extending carrying arm 30. The arm 30 is supported in the plate-like structure 26 for castering when the machine is in a transport mode and is fixed generally for rotation about a transverse axis when it is in working position. At the far right-hand side of the harvesting unit 14 and fixed to the tubular member 24 is a second carrying arm 32 supporting a second ground-engaging wheel 34. Each wheel 28 and 34 rotates about a generally horizontal transverse axis and the respective axes are substantially aligned.

Rigidly carried on the tubular member 24 and extending forwardly therefrom is a grain platform 36. The platform utilizes a conventional reciprocating cutter bar assembly 38 along its leading edge. The height of the cutter bar 38 relative to the ground can be controlled by adjustment of the position of the tubular member 24 relative to the drawbar 12. Rotation of the tubular member 24 adjusts the position of the bar 38 and is effected through extending or retracting the hydraulic cylinder 40 that acts between the left frame member 18 and the tubular member 24.

A harvesting reel 42 is supported above and forwardly of the cutter bar 38 on arms 44 and is pivotally carried on the tubular member 24. The reel 42 includes a main shaft 46 and a plurality of aligned sets of spokes 48 extending radially from the shaft 46 at transversely spaced intervals therealong and a plurality of transversely extending slats 50 connecting the outer ends of the respective aligned spokes 48.

The improved side draft stabilizer 52 is illustrated in detail in FIGS. 2, 3 and 4. In the preferred embodiment, the stabilizer 52 is carried on the left-hand side of the drawbar 12 and has its axis of rotation aligned with the axis of the wheels 28 and 34 when it is in its lowered and operating position (see FIG. 1).

The stabilizer 52 includes a coulter or disk blade 54 journaled on a rearwardly extending arm 56. Bolts 58 secure the blade 54 to a sleeve 60 that is rotatably mounted on a spindle 62 to permit repair or replacement. The arm 56 is pivotally supported for swinging movement by a pin 64 which in turn is carried on the plate-like structure 26. Also supported on this pin 64 is a upwardly extending lever arm 66. The outer end of the lever arm 66 is in turn pivotally connected to the ram end of a hydraulic lift cylinder 68. The base end of the hydraulic cylinder 68 is rigidly coupled to a mounting bar 70 which is bolted to the plate-like structure 26 for movement therewith. Accordingly, the hydraulic cylinder 68, the pivot pin 64 and the disk blade 54 all move with the plate-like structure 26 and the tubular member 24 as the tubular member 24 is rotated by the left cylinder 40 to adjust the harvester height. Thus the axes of the wheels 28 and 34 and disk blades 54 will be aligned during operation for all settings of the cutter bar height.

An adjustable rod 72 is pivotally mounted between the outer end of the lever arm 66 and the disk blade support arm 56. Since the base end of the hydraulic cylinder 68 is rigidly coupled with the plate-like structure 26, extension of the ram will rock the lever arm 66 about the pin 64 and swing the adjustable rod 72 rearwardly to lower the support arm 56 and permit the disk blade 54 to penetrate the ground. The extended hydraulic cylinder 68 further serves to hold the blade 54 in the ground during harvesting operations.

In operation, the tractor will tow the windrower and harvest the crop adjacent the side of the tractor. Because the harvesting unit 14 extends transversely to one side of the drawbar 12, its outer end must be advanced by the towing forces exerted through the drawbar 12 and the tubular member 24. As the outside wheel 34 encounters resistance and rolls forward less rapidly than the inside wheel 28, the outer end will tend to fall back and side draft forces will be exerted on the tractor hitch. As this occurs, a clockwise moment will be generated about the hitch connection on the tractor. This moment can become substantial as the harvester is advanced over hilly terrain.

The side draft or moment generated about the hitch connection is stabilized through contact of the blade 54 with the ground. The blade 54 must act to counter the transverse forces generated by fallback of the outer end of the harvesting unit 14 and transferred to the drawbar 12. These forces act on the drawbar 12 to generate a clockwise moment about the clevis connection with the tractor. Accordingly, the blade 54 can most effectively generate a counterclockwise moment (as viewed in FIG. 1) about the clevis 16 when the force generated by the blade 54 acts transversely on the drawbar 12, at a fore-and-aft distance removed from the clevis 16 that exceeds the moment arm at which the fallback forces act, and when it is closely enough positioned to a fore-and-aft line through the clevis that is parallel to the direction of travel such that the rolling resistance of the blade 54 does not add substantially to the fore-and-aft acting fallback forces or that generated by a clockwise moment about the clevis 16.

In the preferred embodiment illustrated in FIG. 2, the disk stabilizer 52 is mounted on the windrower to the left of the drawbar 12 since the harvesting unit 14 extends to the right of the drawbar 12. If the harvesting unit 14 extended to the left of the drawbar 12, the stabilizer 52 would be most conveniently mounted on the right side of the drawbar 12 where the crop had already been harvested. It could operate conveniently, however, on the left side of the drawbar 12 under these circumstances as long as it were not positioned to interfere with the standing crop. The disk blade 54 is mounted for rotation within a generally vertical plane and has its leading edge directed slightly to the right of a fore-and-aft extending line. The blade 54 is directed to the right approximately 2° to impart a rightward acting force on the drawbar 12 that further counters the clockwise acting moment acting about the hitch connection and generated by the fallback problem. This angle A of direction need only be sufficient to compensate for structural deflection and still provide positive lead toward the uncut crop.

The disk blade 54 will stabilize the implement when it is cutting into soil with sufficient density to resist its sidewards movement. Generally, this depth will be less than two inches (2"). As the blade 54 slices through the soil, it exerts a sideways force on the soil and the soil maintains it in position to resist side draft transferred to the implement as a result of the fallback problem.

During harvesting operations, pull-type implements are towed through sharp cornering manuevers in order to harvest the crop at the corners of the field. As it is turned, the harvesting unit 14 swings about a center of rotation located close to or on the transverse line 74 that extends through the wheel axes. If the axis of the disk blade 54 were not also located substantially along this same transverse line, the wheel 28 would skid through the turn. As located in the preferred embodiment, the blade 54 acts as the center of rotation through which the machine rotates when negotiating sharp corners.

We claim:

1. In a pull-type implement having a fore-and-aft extending drawbar with hitch means at its forward end connectible to a traction vehicle; an elongated harvesting unit having one end fixed to a rearward portion of said drawbar and extending transversely therefrom to one side of said vehicle; ground wheels carrying the harvesting unit, one wheel adjacent to and supporting the one end of said harvesting unit and having a substantial transversely extending axis of revolution; and a side draft stabilizing means carried by the implement said stabilizing means being generally adjacent to said axis of revolution and generally adjacent to a fore-and-aft line extending rearwardly from the hitch means, said stabilizing means further including a vertically shiftable ground-penetrating member.

2. In a pull-type implement having a fore-and-aft extending drawbar with hitch means at its forward end connectible to a tractor; an elongated harvesting unit having one end coupled with a rearward portion of said drawbar and extending transversely to its other end spaced from said tractor; ground-engaging support wheels carrying the unit, one wheel carried adjacent the rearward portion of the drawbar for supporting the one end of said unit, said wheel having a substantially transversely extending axis of revolution; and a side draft stabilizing means including a disk-shaped ground-penetrating blade supported by the implement adjacent to a fore-and-aft line extending rearwardly from said hitch means, the axis of revolution of said blade substantially aligned with the axis of said one wheel.

3. The invention defined in claim 2 wherein the blade rotates within a substantially upright plane which passes diagonally through a fore-and-aft extending line and with the leading edge of said blade diverging from said fore-and-aft line and in the same transverse direction as the harvester unit.

4. In a pull-type implement of the type having a fore-and-aft extending drawbar with hitch means at its forward end connectible to a tractor; an elongated harvesting unit fixed at one end to the one side of said drawbar and extending transversely outwardly to its other end; ground wheels supporting each end of said unit, said wheels carried for rotation about transverse and generally aligned axes; and a side draft stabilizing means carried by the implement including a ground-penetrating blade carried adjacent to a fore-and-aft line extending rearwardly from the hitch means, said blade further being transversely spaced from said wheels and supported for rotation about an axis substantially transversely aligned with the axes of said wheels.

5. The invention defined in claim 4 wherein the blade is spaced transversely from the one end of the harvesting unit and to the transverse side of said drawbar which is opposite of said harvesting unit.

6. The invention defined in claim 4 wherein the blade rotates in an upright plane that forms an acute angle with a fore-and-aft extending line passing through its axis and the leading edge of said blade is directed to the same transverse side of said line as from which the harvesting unit extends.

7. In a pull-type implement of the type having a fore-and-aft extending drawbar with hitch means at its forward end connectible to a tractor; an elongated harvesting unit connected at its one end to one transverse side of said drawbar and extending transversely outwardly to its other end; ground-engaging wheels supporting the ends of said harvesting unit; and a side draft stabilizing means carried by the drawbar adjacent to its other transverse side, said stabilizing means including a ground-penetrating blade rotatably supported on an axis generally transversely aligned with the wheel axes.

8. The invention defined in claim 7 wherein the blade is supported for rotation about a generally horizontal axis and rotates within an upright plane passing diagonally through the fore-and-aft line of advance of said implement.

* * * * *